Figure 1:
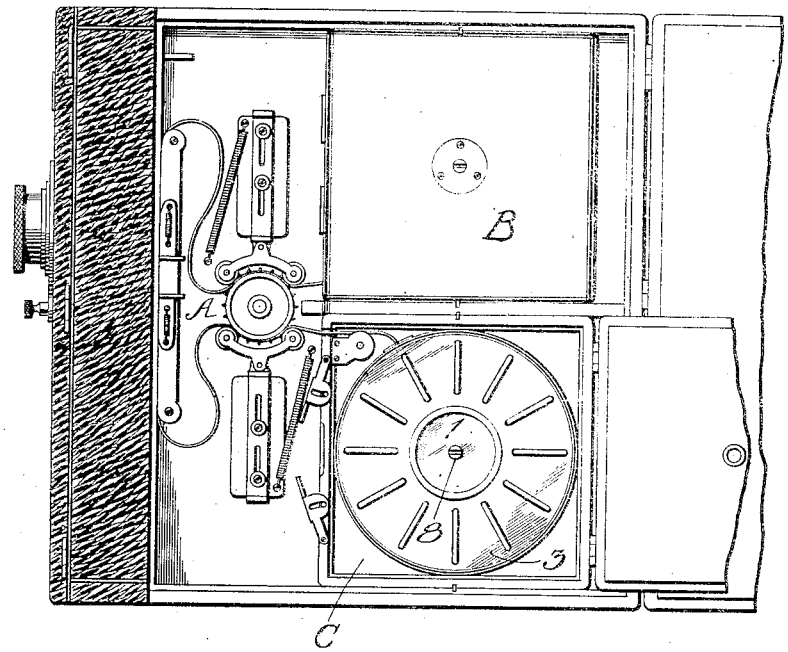

J. R. GRABERT & P. J. FRIEDRICHS.
CONTINUOUS FILM PACKAGE.
APPLICATION FILED AUG. 24, 1914.

1,198,534.

Patented Sept. 19, 1916.

Attest:—
W. S. Rockwell
J. M. Hynboop

Inventors
James R. Grabert
AND Philip J. Friedrichs
BY Knight Bros
Attys.

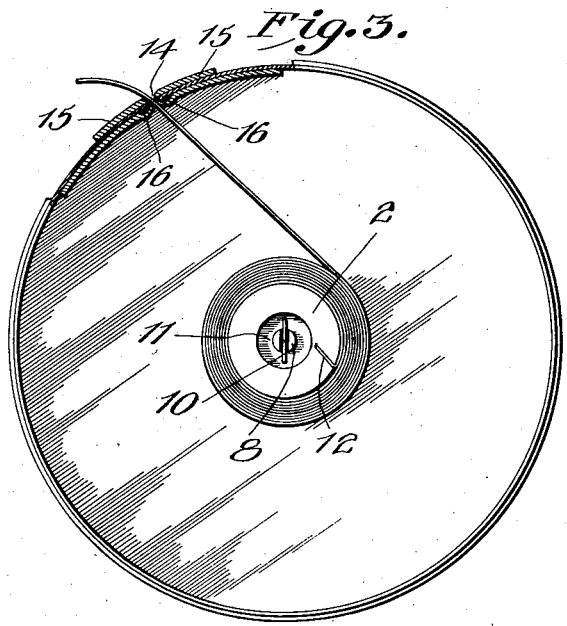
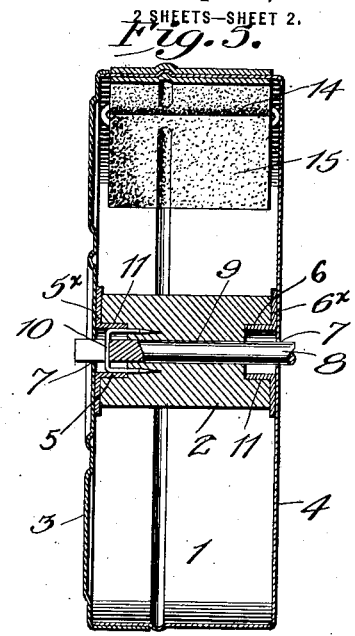
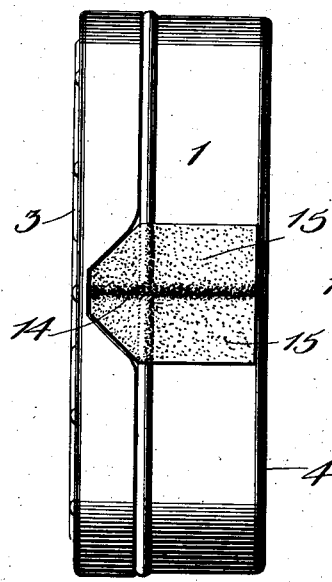
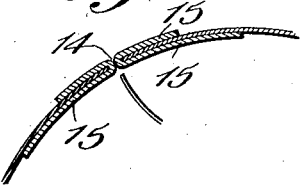
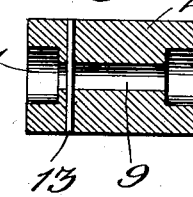
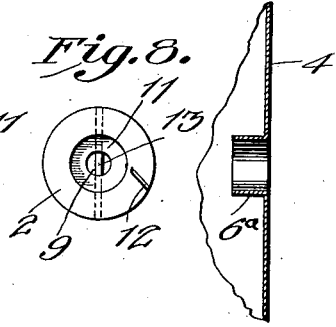

UNITED STATES PATENT OFFICE.

JAMES RÉNÉ GRABERT AND PHILIP JOHN FRIEDRICHS, OF NEW ORLEANS, LOUISIANA, ASSIGNORS OF ONE-THIRD TO CHARLES CARROLL, OF NEW ORLEANS, LOUISIANA.

CONTINUOUS-FILM PACKAGE.

1,198,534.   Specification of Letters Patent.   Patented Sept. 19, 1916.

Application filed August 24, 1914. Serial No. 858,412.

*To all whom it may concern:*

Be it known that we, JAMES R. GRABERT and PHILIP J. FRIEDRICHS, both citizens of the United States, and residents of New Orleans, in the parish of Orleans and State of Louisiana, have invented certain new and useful Improvements in Continuous-Film Packages, of which the following is a specification.

The present invention relates to a container for photographic films and particularly to the original film package or container in which the film manufacturer furnishes the film to the user.

The primary object of the invention is to provide a container which will carry the film continuously, not only before introduction into the photographic apparatus, but during its presence and use therein; and, preferably, also as a means of safe removal of the exposed film from the photographic apparatus, and subsequent handling; or more specifically stated, to construct the original container for photographic films in such a manner as will permit a number of such containers with their contained films, and without opening, to be interchangeably introduced bodily into and to coöperate with the magazine of a camera, or a pair of such containers, one with and the other without the film, to be used in both the delivery and receiving magazines, or in coöperative relationship with the controlling mechanism of such magazines, if the walls of the magazines be omitted.

Heretofore, manufacturers of photographic films and especially the manufacturers of raw motion picture films, have furnished such films to the user in an ordinary tin box or the like, sealed to exclude light and impurities. The film shipped in this kind of a can has to be taken from the can and placed in the magazine of the camera, in a dark room, which proceeding can never be carried out in the field, and, therefore, not only involves the inconvenience of loading up a number of special magazines, as a separate step in the use of the camera, but involves carrying such extra magazines with the camera, thereby limiting the operating capacity and increasing the cost of equipment. The present invention eliminates this bad feature by adapting the original shipping container for films, to be directly introduced into the camera without removal of the film from the container, so that any desired number of such original packages can be used without the use of a dark room or any substitute therefor. Moreover, this same original container may, when empty, be used as a receiver in the camera into which the exposed film is wound, so that whereas in the method heretofore employed it has also been necessary to use the dark room in taking the film from the receiving magazine, after exposure, and removal from the camera proper, the present invention eliminates this bad feature by using an empty container in relation to the exposure mechanism of the ordinary receiving magazine of the camera, whereby the film, after it has passed through the exposure mechanism of the camera, may be readily taken from the magazine without light or other impurities reaching it.

It can be readily seen that the photographer, when using a container constructed in accordance with the present invention, may enter the field without carrying with him any extra camera magazines, as was necessary for him to do when employing the old method.

In carrying out the invention, the container is adapted to receive and hold photographic films, mounted and wound upon a spool which is constructed differently from spools heretofore employed, in that supporting and guiding journal bearings are provided between the spool and container which leave the roll free to rotate, while a light-proof slit in a wall of the container permits the film to pass during its travel to or from the exposure mechanism of the camera, and both the container and spool are provided with openings coaxial with the journal bearings to permit the ordinary camera spindles to enter into rotary control of the roll.

The invention resides in a container having the essential features of construction and coöperative relationship as above outlined, and incident to the illustrative embodiment hereinafter particularly described and pointed out in the subjoined claims; also in certain novel details of construction to be found in said illustrative embodiment, and as pointed out in the claims.

Figure 2:
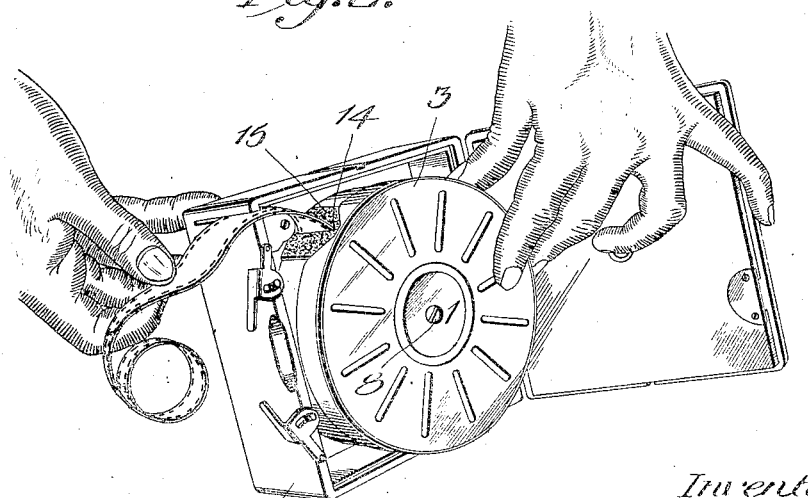

In the accompanying drawings:—Figure 1 is a side view of a camera having the present invention applied thereto; the receiving magazine thereof being opened to show the new container inserted therein; Fig. 2 is a perspective view of a film magazine showing the manner of applying the container; Fig. 3 is a top plan view of the container with the cover removed, and showing that portion of its side in section which embodies the slit through which the film passes; Fig. 4 is a detail view of the side of the container, showing a modified form of slit; Fig. 5 is a sectional view of the container, showing the internal parts; Fig. 6 is a side elevation of the container; Fig. 7 is a cross section of a modified form of spool; Fig. 8 is an end view of a spool as shown in Fig. 7, and Fig. 9 is a detail view of a modified form of bearing for mounting the spool in the container.

Referring to the illustrative embodiment in detail, A represents the exposure mechanism of a motion picture camera, and B and C represent the delivery and receiving magazines, respectively, all of which are of conventional construction and for which, per se, the applicants claim no invention.

1 represents a container, embodying the essential features of this invention and constructed of any desired form or material.

2 represents the spool upon which the film is wound.

The container 1 has a removable cover or top piece 3 carrying one end wall, and a bottom piece 4 carrying the other end wall and the annular side wall, as shown in Fig. 5.

5 and 6 represent journals separately constructed and applied to the respective end walls of the container, and on which the spool 2 is adapted to be mounted through the medium of journal-bearings 11 provided in its ends. These journals are formed by mounting annular collars on the inside of the end walls of the container coaxially with the apertures 7, provided in the end walls to receive the spindle 8 of the magazine. As suggested by the modified form of journal 6ª shown in Fig. 9, the journals for the spool may be made by merely upsetting the metal in the shape of annular collars around the center apertures of the end walls of the container. When this form of journal is made, it will be noticed that the end wall opening of the container which receives the spindle 8 coincides with the internal dimension of the journal bearing 11. The spool 2 is constructed with an axial spindle bore 9 to receive the spindle 8 of the magazine. This spindle has a bifurcated head which engages the means provided on the spool to insure joint rotation of the spindle and spool, as for instance the staple 10 in Fig. 5, or the diametrical pin 13 of Figs. 7 and 8. Flanges 5 and 6 which provide the journals in connection with the reinforcing base flanges 5ˣ, 6ˣ, from which they project, make light and dust-proof closures with the spool when they project into and abut tightly against the ends of the spool, and this is also true of the journal flanges formed integral with the container and the end walls from which they project in Fig. 9. These tight closures nevertheless leave the film roll and spool free to revolve under control of the entering spindle. 12 represents a slit on the side of the spool to receive the end of the film. The depth of this slit is preferably such that it does not reach the journal bearings 11 in the ends of the spool and it, therefore, does not impair the light-proof condition of the package.

The modified form of staple shown in Figs. 7 and 8 is formed by a pin 13 extending through the spool transversely to its axis. 14 represents the slit in the side wall of the container, through which the film passes in its travel to and from the exposure mechanism A. This slit may be of a length to properly receive the film, it being also constructed in a manner to exclude light from the inside of the container. To accomplish this last expedient, the slit may be provided with two pieces of plush 15 which pass through the slit in contact with each other and have their respective ends securely fixed to the inside and outside of the container. To properly brace the slit against spreading and to lend increased thickness to the walls of the slit with consequent security against leakage of light, brace pieces 16 may be used to advantage; however, this is not a necessity as the slit may be constructed in accordance with the modified form shown in Fig. 4.

It is the practice to seal original packages of continuous photographic films by applying, around the joint between the body and the cover of the container, a strip of adhesive plaster, which serves to keep out light and impurities. The film package constructed in accordance with the present invention will be similarly reinforced against the admission of influences that would injure the film, and its end wall openings will be sealed by the suitable application of similar material in position to hermetically close them. But unlike the film packages heretofore made, the present package can be put into use without the necessity of stripping off the sealing plaster; the seals applied over the axial end openings being, if desired, merely punctured by the application of the package to the spindle, and the annular sealing strip being merely slitted where it overlies the light-proof film package of the container. Or these seals over the spindle openings may be removed without removing the main seal around the annular wall.

From the foregoing, it will be seen that a film container embodying the essential features of this invention and properly loaded, will provide a neat and cheap original film package, which will not only prevent light and impurities from injuring the film, but will enter directly into operative relation with the camera without opening; also that empty containers of such construction may be employed for winding exposed film in the operation of the camera, and removal of the exposed film from the camera. Moreover, the construction of independent rotary mounting for the film within the novel container provides for admission of the controlling member of the camera without admitting light or impurities through the bearings.

We claim:—

1. A package for continuous films for cameras, comprising a relatively thin container constructed with a removable cover and having a film slot formed in its side wall, and having upon its end wall, an annular journal bearing constructed to support and guide a roll of film with freedom of rotation; said journal bearing and the wall which carries it, being formed with coaxial openings to permit a spindle to enter the container and assume control of the film roll therein, said end wall also carrying an abutment bearing for the film spool.

2. A package for continuous films for cameras, comprising a relatively thin container constructed with a removable cover and having a film slot formed in its side wall, and having upon its end-wall, an annular journal bearing constructed to support and guide a roll of film with freedom of rotation; said journal bearing and the wall which carries it, being formed with coaxial openings to permit a spindle to enter the container and assume control of the rotation of the film-roll therein; said end-wall also carrying an abutment bearing for the film-spool and said end-wall journal-bearing comprising a flange surrounding the end-wall opening and projecting inwardly in position to enter a recess in a film-spool, whereby a light tight joint with the spool is effected.

3. A container for continuous films for cameras, said container having a film-slot, formed in its side wall, and having upon its end-wall, an annular journal bearing constructed to support and guide a roll of film with freedom of rotation; said journal bearing and the wall which carries it, being formed with coaxial openings to permit a spindle to enter the container and assume control of the rotation of the film-roll therein; said end-wall also carrying a base ring providing a reinforcing abutment bearing for the film-spool, and said end-wall journal-bearing comprising a flange surrounding the end-wall opening and projecting inwardly in position to enter a recess in a film-spool, whereby a light tight joint with the spool is effected.

4. A photographic film-roll having a spool constructed with an axial spindle-bearing, and with an independent journal-bearing coaxial with the spindle-bearing, whereby the roll is adapted for mounting, with freedom of rotation, upon one journal while receiving a spindle in relation to control its rotation.

5. A photographic film-roll having a winding and unwinding spool constructed with an axial spindle-bearing adapting the spool to be applied over a controlling spindle, and having at its ends, journal bearings coaxial with but independent of the spindle-bearing, adapting the roll to receive rotary support and guidance independently of the spindle, while leaving its rotation subject to control by the spindle.

6. A photographic film-roll having a winding and unwinding spool constructed with an axial spindle-bearing adapting the spool to be applied over a controlling spindle, and with a journal bearing coaxial with, but independent of the spindle bearing, adapting the roll to receive rotary support and guidance independently of the spindle, while leaving its rotation subject to control by the spindle; said spool also having means for interlocking it with the spindle to insure rotation of the roll with the spindle.

7. In combination, a film spool having a spindle-bore and an independent journal bearing coaxial with said spindle-bore and a film-container adapted to receive said film-spool with a film thereon, and constructed in its side wall with a film-slot, and provided, upon its end wall, with an independent journal to receive the journal bearing of the spool; coaxial spindle openings being provided through the end wall and journal, which aline with the spindle-bore of the spool when in position, a spindle engaging in said spindle bore and means for keying said spindle and film spool together.

8. In combination, a film spool having a spindle-bore and an independent journal bearing coaxial with said spindle-bore and a film-container adapted to receive said film-spool with a film thereon, and constructed in its side wall with a film-slot, and provided, upon its end wall, with a journal to receive the journal bearing of the spool; coaxial spindle openings being provided through the end wall and journal which aline with the spindle-bore of the spool when in position, a spindle engaging in said spindle bore, means for holding said spool and spindle rigidly together in a circumferential direction but permitting axial displacement between them.

9. In combination, a film spool having a spindle-bore and an independent journal bearing coaxial with said spindle-bore and a film-container adapted to receive said film-spool with a film thereon, and constructed in its side wall with a film-slot, and provided, upon its end wall, with a journal to receive the journal bearing of the spool; coaxial spindle openings being provided through the end wall and journal which aline with the spindle-bore of the spool when in position, a spindle engaging in said spindle bore, means for holding said spool and spindle rigidly together in a circumferential direction but permitting axial displacement between them, said means comprising a transverse member in the spool and a forked end on the spindle.

The foregoing specification signed at New Orleans, Louisiana, this 3d day of August, 1914.

JAMES RÉNÉ GRABERT.
PHILIP JOHN FRIEDRICHS.

In presence of—
IRWIN A. BEYER,
AZZO J. PLOUGH.